(12) United States Patent
Kankaanranta et al.

(10) Patent No.: US 11,381,089 B2
(45) Date of Patent: *Jul. 5, 2022

(54) ELECTRIC POWER SYSTEM AND A METHOD AND EQUIPMENT FOR CONTROLLING THE SAME

(71) Applicant: Danfoss Editron Oy, Lappeenranta (FI)

(72) Inventors: Tommi Kankaanranta, Lappeenranta (FI); Ville Naumanen, Ylämaa (FI)

(73) Assignee: DANFOSS EDITRON OY, Lappeenranta (FI)

( * ) Notice: Subject to any disclaimer, the term of this patent is extended or adjusted under 35 U.S.C. 154(b) by 94 days.

This patent is subject to a terminal disclaimer.

(21) Appl. No.: 16/855,018

(22) Filed: Apr. 22, 2020

(65) Prior Publication Data

US 2020/0251908 A1 Aug. 6, 2020

Related U.S. Application Data

(63) Continuation of application No. 15/849,773, filed on Dec. 21, 2017, now Pat. No. 10,673,243.

(30) Foreign Application Priority Data

Jan. 4, 2017 (EP) .................................... 17150237

(51) Int. Cl.
*H02J 3/38* (2006.01)
*H02J 1/14* (2006.01)
(Continued)

(52) U.S. Cl.
CPC .............. *H02J 3/381* (2013.01); *B63H 21/20* (2013.01); *H02J 1/102* (2013.01); *H02J 1/14* (2013.01);
(Continued)

(58) Field of Classification Search
None
See application file for complete search history.

(56) References Cited

U.S. PATENT DOCUMENTS 7,544,108 B2 * 6/2009 Rzadki ................... B63H 23/24
440/6
9,413,164 B2 * 8/2016 Hoeven .................. B63H 25/42
(Continued)

FOREIGN PATENT DOCUMENTS

EP 2 218 638 A1 8/2010
EP 2 682 339 A1 1/2014
(Continued)

OTHER PUBLICATIONS

Office Action issued in Japanese Patent Application No. 2017-245338 dated Aug. 10, 2021.
(Continued)

*Primary Examiner* — Rexford N Barnie
*Assistant Examiner* — Terrence R Willoughby
(74) *Attorney, Agent, or Firm* — Nixon & Vanderhye (57) ABSTRACT

An electric power system includes electric energy sources and control equipment for controlling the electric energy sources in accordance with a target value of electric power produced by the electric power system. The control equipment activates and deactivates the electric energy sources based on a control value and on activation and deactivation limits. The control value can be the target value or the actual value of the electric power. The control equipment controls active electric energy sources according to the target value and according to power sharing defined for the active electric energy sources. The activation and deactivation limits as well as activation and deactivation order of the electric energy sources can be determined based on proper- (Continued)

ties of the electric energy sources and on a prevailing operational situation of the electric power system.

15 Claims, 2 Drawing Sheets

(51) Int. Cl.
  *B63H 21/20* (2006.01)
  *H02J 1/10* (2006.01)
  *B63H 21/21* (2006.01)
(52) U.S. Cl.
  CPC .. *B63H 2021/205* (2013.01); *B63H 2021/216* (2013.01); *H02J 1/106* (2020.01); *Y02T 70/5236* (2013.01)

(56) References Cited

U.S. PATENT DOCUMENTS

| | | | | |
|---|---|---|---|---|
| 2014/0091749 | A1* | 4/2014 | Nevins | H02J 7/342 320/103 |
| 2016/0282892 | A1* | 9/2016 | Saavedra | G05B 15/02 |
| 2017/0373498 | A1* | 12/2017 | Haugan | H02H 3/26 |
| 2019/0039707 | A1* | 2/2019 | Ezaki | H02J 3/38 |

FOREIGN PATENT DOCUMENTS

| | | |
|---|---|---|
| EP | 2 690 738 A2 | 1/2014 |
| JP | S61-102132 A | 5/1986 |
| JP | H09-310674 A | 12/1997 |
| JP | 2009-201323 A | 9/2009 |
| JP | 2010-222001 A | 10/2010 |
| JP | 2016-078565 A | 5/2016 |
| KR | 10-2015-0030307 A | 3/2015 |
| KR | 10-2015-0143902 A | 12/2015 |
| WO | 2012/092503 A2 | 7/2012 |

OTHER PUBLICATIONS

Paran, S. "MPC-based power management in the shipboard power system", 2015 IEEE Electric Ship Technologies Symposium (ESTS), 14-18, only Jul. 16, 2015 XP055377519, DOI: 10 1109/ESTS.2015. 7157855.

EP Search Report, dated Jun. 12, 2017, from corresponding EP 17150237 application.

Office Action issued in Korean Patent Application No. 10-2018-0001217 dated Sep. 23, 2021.

Office Action issued in Japanese Patent Application No. 2017-245338 dated Jan. 25, 2022.

* cited by examiner

ELECTRIC POWER SYSTEM AND A METHOD AND EQUIPMENT FOR CONTROLLING THE SAME

FIELD OF THE DISCLOSURE

The disclosure relates generally to an electric power system comprising electric energy sources such as, for example but not necessarily, combustion engine driven generators, batteries, and/or fuel cells. More particularly, the disclosure relates to control equipment, to a method, and to a computer program for controlling an electric power system.

BACKGROUND

In many cases, an electric power system comprises electric energy sources each of which can be individually activated and deactivated so that different ones of the electric energy sources can be active at different moments of time. The electric power system can be for example a part of an electric system of a ship or a ferry in which case the electric power system is typically arranged to supply electric power to one or more propulsion motors, to an alternating voltage network of the ship or ferry, and/or to other loads such as e.g. one or more bow thruster motors. The motors are advantageously alternating current "AC" motors which are supplied with inverters for converting direct voltage of a direct voltage rail into alternating voltages suitable for the AC-motors. Each of the electric energy sources can be for example a combustion engine driven generator, a battery, or a fuel cell.

An inherent challenge related to electric power systems of the kind described above is the need to control the electric energy sources so that an optimal or at least a near optimal subset of the electric energy sources is active in each operating situation of the electric power system. Factors which have significance when selecting electric energy sources to be activated or deactivated are: electric power that needs to be produced by the electric power system, operating costs of the electric energy sources, efficiencies of the electric energy sources, starting characteristics of the electric energy sources, serviceable life times of the electric energy sources, and/or other factors such as an operation mode of the electric power system. In a case of a ship or ferry, the operation modes can be e.g. open sea operation and harbor operation. In this document, the term efficiency means a ratio between output power of an electric energy source and a sum of the output power and losses of the electric energy source. The starting characteristics may mean for example time and energy needed for activating an energy source to produce electric power. For example, a charged battery does not need time and externally given energy for being activated to produce electric energy but e.g. a combustion engine driven generator needs time and externally given energy for starting the combustion engine.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new method for controlling an electric power system that comprises electric energy sources for supplying electric power to one or more loads of the electric power system.

A method according to the invention comprises:
receiving a target value of the electric power produced by the electric power system,
activating, from among inactive ones of the electric energy sources, one electric energy source in response to a situation in which a control value exceeds an activation limit, the control value being dependent on the target value of the electric power or the actual value of the electric power,
deactivating, from among active ones of the electric energy sources, one electric energy source in response to a situation in which the control value drops below a deactivation limit, and
controlling the active ones of the electric energy sources according to the target value and according to power sharing defined for the active ones of the electric energy sources.

The electric energy source to be activated is selected, from among the inactive electric energy sources, at least partly on the basis of temporal lengths of prevailing inactivity periods of the inactive electric energy sources.

The above-mentioned activation limit and deactivation limit as well as activation and deactivation order of the electric energy sources can be determined based on the properties of the electric energy sources and on a prevailing operational mode of the electric power system. Thus, the above-described method allows several factors to be taken into account in the control of the electric energy sources. The factors may include for example: operating costs of the electric energy sources, efficiencies of the electric energy sources, starting characteristics of the electric energy sources, and/or serviceable life times of the electric energy sources. The energy sources are advantageously activated and deactivated so that energy sources which happen to be active at each time can operate in their advantageous ranges of loading.

In accordance with the invention, there is provided also new control equipment for controlling an electric power system that comprises electric energy sources for supplying electric power to one or more loads of the electric power system.

Control equipment according to the invention comprises signal outputs for transmitting control signals for controlling the electric energy sources, a signal input for receiving a target value of electric power produced by the electric power system, and a controller configured to:
activate, from among inactive ones of the electric energy sources, one electric energy source in response to a situation in which a control value exceeds an activation limit, the control value being dependent on the target value of the electric power or the actual value of the electric power,
deactivate, from among active ones of the electric energy sources, one electric energy source in response to a situation in which the control value drops below a deactivation limit, and
control the active ones of the electric energy sources according to the target value and according to power sharing defined for the active ones of the electric energy sources.

The controller is configured to select, from among the inactive electric energy sources, the electric energy source to be activated at least partly on the basis of temporal lengths of prevailing inactivity periods of the inactive electric energy sources.

In accordance with the invention, there is provided also a new electric power system that comprises electric energy sources for supplying electric power to one or more loads of the electric power system and control equipment according to the invention for activating and deactivating the electric energy sources.

In accordance with the invention, there is provided also a new computer program for controlling an electric power system of the kind described above. A computer program according to the invention comprises computer executable instructions for controlling a programmable processing system to:

- activate, from among inactive ones of electric energy sources, one electric energy source in response to a situation in which a control value exceeds an activation limit, the control value being dependent on a target value of electric power produced by the electric power system or the actual value of the electric power,
- deactivate, from among active ones of the electric energy sources, one electric energy source in response to a situation in which the control value drops below a deactivation limit, and
- control active ones of the electric energy sources according to the target value and according to power sharing defined for the active ones of the electric energy sources.

The computer program comprises computer executable instructions for controlling the programmable processing system to select, from among the inactive electric energy sources, the electric energy source to be activated at least partly on the basis of temporal lengths of prevailing inactivity periods of the inactive electric energy sources.

In accordance with the invention, there is provided also a new computer program product. The computer program product comprises a non-volatile computer readable medium, e.g. a compact disc "CD", encoded with a computer program according to the invention.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below in the sense of examples and with reference to the accompanying drawings, in which.

DESCRIPTION OF EXEMPLIFYING AND NON-LIMITING EMBODIMENTS

The specific examples provided in the description below should not be construed as limiting the scope and/or the applicability of the accompanied claims. Lists and groups of examples provided in the description are not exhaustive unless otherwise explicitly stated.

Figure 1:
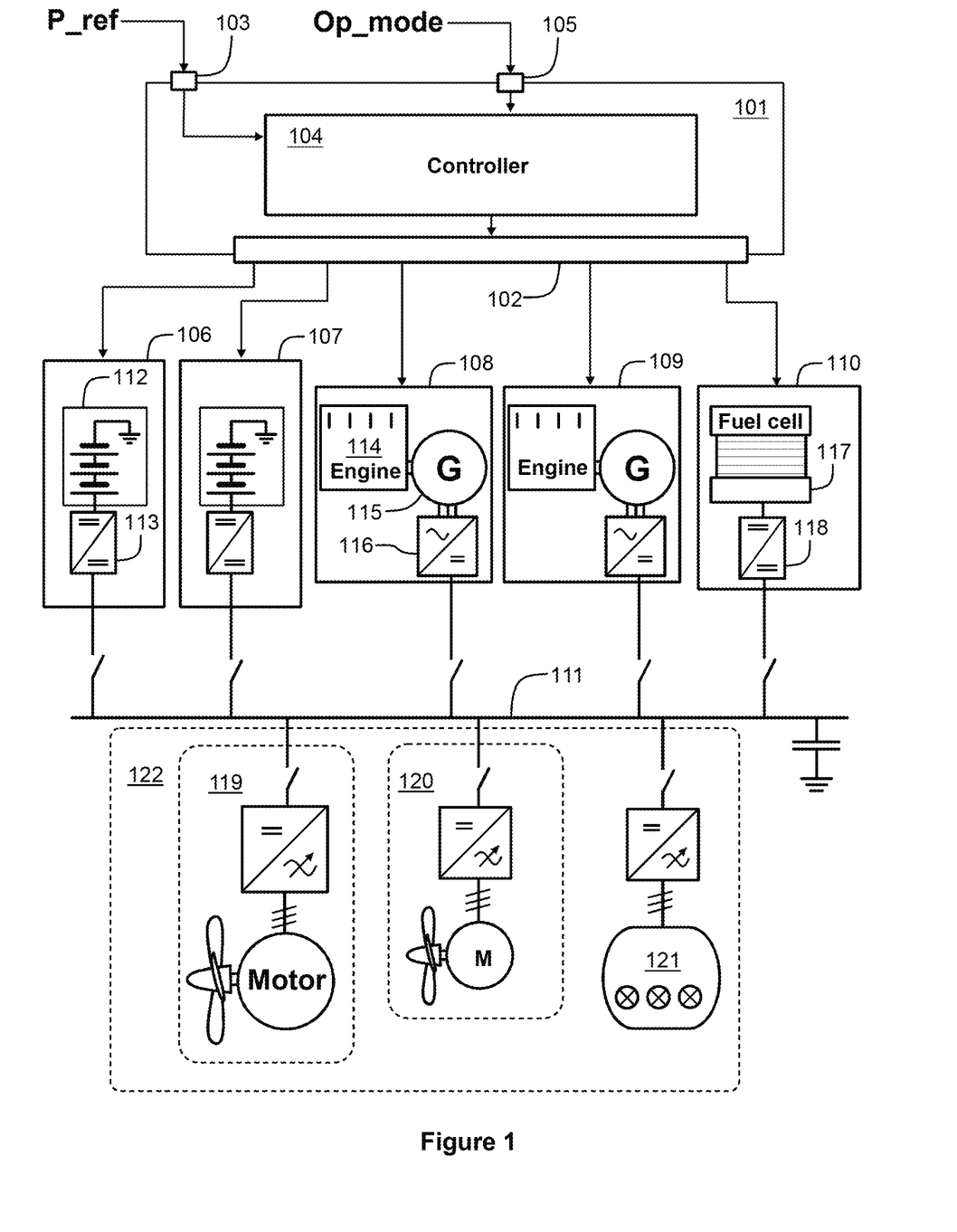
FIG. 1 illustrates an electric power system according to an exemplifying and non-limiting embodiment of the invention.

FIG. 1 shows a schematic illustration of an electric power system according to an exemplifying and non-limiting embodiment of the invention. In this exemplifying case, the electric power system is a part of an electric system of a ship or a ferry. The electric power system comprises electric energy sources 106, 107, 108, and 109 for supplying electric power to a load 122 of the electric power system. In this exemplifying case, the electric energy sources 106-110 are arranged to supply electric power to a direct voltage rail 111 which is connected to the load 122. In the exemplifying case illustrated in FIG. 1, the load 122 comprises a propulsion system 119, a bow thruster system 120, and an alternating voltage network 121 of the ship or ferry. The load 122 may further comprise electric devices and/or systems which are not shown in FIG. 1. In the exemplifying electric power system illustrated in FIG. 1, each of the electric energy sources 106 and 107 comprises a battery and a direct voltage-to-direct voltage "DC-DC" converter for converting the direct voltage of the battery into to the direct voltage of the direct voltage rail 111. In FIG. 1, the battery of the electric energy source 106 is denoted with a reference 112 and the DC-DC converter of the electric energy source 106 is denoted with a reference 113. Each of the electric energy sources 108 and 109 comprises a combustion engine, a generator driven with the combustion engine, and a converter for converting the voltage of the generator into to the direct voltage of the direct voltage rail 111. The combustion engine can be for example a diesel engine and the generator can be for example an electrically excited synchronous generator, a permanent magnet synchronous generator, or an asynchronous generator. In FIG. 1, the combustion engine of the electric energy source 108 is denoted with a reference 114, the generator of the electric energy source 108 is denoted with a reference 115, and the converter of the electric energy source 108 is denoted with a reference 116. The electric energy source 110 comprises a fuel cell 117 and a "DC-DC" converter 118 for converting the direct voltage of the fuel cell 117 into to the direct voltage of the direct voltage rail 111.

The electric power system comprises control equipment 101 according to an exemplifying and non-limiting embodiment of the invention for controlling the electric energy sources 106-110. The control equipment 101 comprises signal outputs 102 for transmitting control signals for controlling the electric energy sources 106-110, and a signal input 103 for receiving a target value P_ref of electric power P produced by the electric power system. The electric power P produced by the electric power system is the sum of electric powers produced by individual ones of the electric energy sources 106-110. It is worth noting that the electric power produced by the electric energy source 106 is negative when the battery 112 is charged. Correspondingly, the electric power produced by the electric energy source 107 can be negative. The control equipment 101 comprises a controller 104 that is configured to activate, from among inactive ones of the electric energy sources 106-110, one electric energy source in response to a situation in which a control value CV exceeds an activation limit L_act. The control value CV can be the target value P_ref of the electric power P. It is also possible that the control value CV is the actual value P_act of the electric power P. An advantage of using the target value P_ref as the control value CV is that the control can be more proactive than when using the actual value P_act as the control value CV because there is a delay from each change of the target value P_ref to a corresponding change of the actual value P_act. Exemplifying ways to select, from among the inactive electric energy sources, one electric energy source to be activated are described later in this document. The controller 104 is configured to deactivate, from among active ones of the electric energy sources 106-110, one electric energy source in response to a situation in which the above-mentioned control value CV drops below a deactivation limit L_dac. Exemplifying ways to select, from among the active electric energy sources, one electric energy source to be deactivated are described later in this document.

The controller 104 is configured to control active ones of the electric energy sources 106-110 according to the target value P_ref and according to power sharing defined for the active electric energy sources. The power sharing can be for example according to maximum powers of the active electric energy sources so that each active electric energy source is controlled to produce electric power that is C×the maximum electric power of the active electric energy source under consideration, where C≤1, C is the same for all of the active electric energy sources, and C×the sum of the maximum electric powers of the active electric energy sources is the target value P_ref. In this exemplifying case, each active electric energy source is controlled to produce a same proportion of its maximum electric power, wherein the proportion depends on the target value P_ref. Depending on the properties of the electric energy sources 106-110 it can be also possible that active electric energy sources are controlled to produce mutually equal electric powers.

The above-mentioned activation limit L_act can be for example a first predetermined proportion of the sum of the maximum electric powers of active electric energy sources. In an exemplifying case where each active electric energy source is controlled to produce C×its maximum electric power, one of inactive electric energy sources is activated when C exceeds the above-mentioned first predetermined proportion. The above-mentioned deactivation limit L_dac can be a second predetermined proportion of the sum of the maximum electric powers of the active electric energy sources. In the exemplifying case where each active electric energy source is controlled to produce C×its maximum electric power, one of the active electric energy sources is deactivated when C drops below the above-mentioned second predetermined proportion. The second predetermined proportion is smaller than the first predetermined proportion i.e. the deactivation limit L_dac is smaller than the activation limit L_act in order to avoid oscillations between activations and deactivations.

In control equipment according to an exemplifying and non-limiting embodiment of the invention, the controller 104 is configured to determine the activation limit L_act at least partly on the basis of the sum of the maximum electric powers of active electric energy sources and on the basis of data related to the one of the inactive electric energy sources which has been selected to be activated when the above-mentioned control value CV exceeds the activation limit L_act. The activation limit L_act can be for example K_act×the sum of the maximum electric powers of the active electric energy sources, where K_act is dependent on the data related to the inactive electric energy source which has been selected to be activated when needed. The data may express for example starting characteristics of the inactive electric energy source selected to be activated when needed. The starting characteristics may mean for example time and energy needed for activating the energy source to produce electric power. For example, a charged battery does not need time and externally given energy for being activated to produce electric energy but e.g. a combustion engine driven generator needs time and externally given energy for starting the combustion engine. Thus, for example, in a case where the inactive electric energy source selected to be activated is a battery, K_act can be e.g. 0.75 i.e. the inactive electric energy source is activated when the control value CV exceeds 75% of the sum of the maximum electric powers of the active electric energy sources. For another example, in a case where the inactive electric energy source selected to be activated is a generator driven by a combustion engine that needs time and external energy for starting, K_act can be e.g. 0.60 i.e. the inactive electric energy source is activated already when the control value CV exceeds 60% of the sum of the maximum electric powers of the active electric energy sources.

In control equipment according to an exemplifying and non-limiting embodiment of the invention, the controller 104 is configured to determine the activation limit L_act at least partly on the basis of the sum of the maximum electric powers of the active electric energy sources and on the basis of data related to the active electric energy sources. The activation limit L_act can be for example Q_act×the sum of the maximum electric powers of the active electric energy sources where Q_act is dependent on the data related to the active electric energy sources. The data may express for example advantageous ranges of loading of the active electric energy sources where the active electric energy sources can operate at their maximal or at least near maximal efficiencies. For example, if each of the active electric energy sources can operate in its advantageous range of loading when the electric power P produced by the electric power system is e.g. 50% . . . 70% of the sum of the maximum electric powers of the active electric energy sources, the above-mentioned Q_act can be e.g. 0.75 so as to initiate an activation of an inactive electric energy source when the electric power P increases so that at least one of the active electric energy sources could no more operate in its advantageous range of loading unless the inactive electric energy source is activated. The activation increases the sum of maximum electric powers of active electric energy sources, and thus the activation can restore the situation in which the electric power P is an advantageous proportion of the sum of the maximum electric powers of the active electric energy sources.

In control equipment according to an exemplifying and non-limiting embodiment of the invention, the controller 104 is configured to determine the deactivation limit L_dac at least partly on the basis of the sum of the maximum electric powers of the active electric energy sources and on the basis of data related to those of the active electric energy sources which remain active after possible deactivation of one of the active electric energy sources. The deactivation limit L_dac can be for example K_dac×the sum of the maximum electric powers of the active electric energy sources where K_dac is dependent on the data related to those of the active electric energy sources which remain active after the possible deactivation. The data may express for example how rapidly the remaining active electric energy sources can respond to abrupt increases in the target value P_ref of the electric power. Typically, K_dac can be greater in cases where the remaining active electric energy sources are fast to respond to power needs than in cases where the remaining active energy sources are slower to respond to power needs. For another example, the above-mentioned data may express advantageous ranges of loading of the active electric energy sources where the active electric energy sources can operate at their maximal or at least near maximal efficiencies. For example, if each of the active electric energy sources can operate in its advantageous range of loading when the electric power P produced by the electric power system is e.g. 50% . . . 70% of the sum of the maximum electric powers of the active electric energy sources, the above-mentioned K_dac can be e.g. 0.45 so as to initiate a deactivation of one of the active electric energy sources when the electric power P decreases so that at least one of the active electric energy sources could no more operate in its advantageous range of loading unless the one of the active electric energy sources is deactivated. The deactivation decreases the sum of maximum electric powers of active electric energy sources, and thus the deactivation can restore the situation in which the electric power P is an advantageous proportion of the sum of the maximum electric powers of the active electric energy sources.

It is to be noted that the above-presented principles to determine the activation limit L_act and the deactivation limit L_dac are only non-limiting examples and many other principles can be applicable as well. Furthermore, it is also possible to determine the activation limit L_act and the deactivation limit L_dac so that two or more different principles are applied to obtain preliminary activation and deactivation limits, and thereafter the activation and deactivation limits L_act and L_dac are obtained based on the preliminary activation and deactivation limits using suitable mathematical and/or logical operations.

The controller 104 is configured to select, from among inactive electric energy sources, an electric energy source to be activated at least partly on the basis of temporal lengths of prevailing inactivity periods of the inactive electric energy sources. Thus, a particular one of the inactive electric energy sources which has been inactive for a longest time can be selected to be activated when a need for activation takes place. It is also possible that the temporal lengths of the prevailing inactivity periods of the inactive electric energy sources are weighted with energy source-specific weight factors. In this exemplifying case, a particular one of the inactive electric energy sources whose weighted temporal length of the prevailing inactivity period is longest can be selected to be activated when a need for activation takes place. The weight factors can be used e.g. in cases where different ones of the electric energy sources have different suitability for being repeatedly activated and deactivated. The weight factor can be higher for such energy sources which are more suitable for being repeatedly activated and deactivated than for energy sources which are not so suitable for being repeatedly activated and deactivated.

In control equipment according to an exemplifying and non-limiting embodiment of the invention, the controller 104 is configured to select, from among active electric energy sources, an electric energy source to be deactivated at least partly on the basis of temporal lengths of prevailing activity periods of the active electric energy sources. In this exemplifying case, a particular one of the active electric energy sources which has been active for a longest time can be selected to be deactivated when a need for deactivation takes place. It is also possible that the temporal lengths of the prevailing activity periods of the active electric energy sources are weighted with energy source-specific weight factors. In this exemplifying case, a particular one of the active electric energy sources whose weighted temporal length of the prevailing activity period is longest can be selected to be deactivated when a need for deactivation takes place. The weight factors can be used e.g. in cases where different ones of the electric energy sources have different suitability for being repeatedly activated and deactivated. The weight factor can be higher for such energy sources which are more suitable for being repeatedly activated and deactivated than for energy sources which are not so suitable for being repeatedly activated and deactivated.

In control equipment according to an exemplifying and non-limiting embodiment of the invention, the controller 104 is configured to select, from among inactive electric energy sources, an electric energy source to be activated at least partly on the basis of cumulative service times of the inactive electric energy sources. In this exemplifying case, a particular one of the inactive electric energy sources whose cumulative service time is shortest can be selected to be activated when a need for activation takes place. This approach tends to balance the cumulative service times of the electric energy sources. It is also possible that the cumulative service times of the inactive electric energy sources are weighted with energy source—specific weight factors. In this exemplifying case, a particular one of the inactive electric energy sources whose weighted cumulative service time is shortest can be selected to be activated when a need for activation takes place. The weight factors can be used e.g. in cases where different ones of the electric energy sources have different operating lifetimes. The weight factor can be higher for such energy sources which have shorter operating lifetimes than for energy sources which have longer operating lifetimes. This approach tends to balance the rates of wear of the electric energy sources.

In control equipment according to an exemplifying and non-limiting embodiment of the invention, the controller 104 is configured to select, from among active electric energy sources, an electric energy source to be deactivated at least partly on the basis of cumulative service times of the active electric energy sources. In this exemplifying case, a particular one of the active electric energy sources whose cumulative service time is longest can be selected to be deactivated when a need for deactivation takes place. This approach tends to balance the cumulative service times of the electric energy sources. It is also possible that the cumulative service times of the active electric energy sources are weighted with energy source-specific weight factors. In this exemplifying case, a particular one of the active electric energy sources whose weighted cumulative service time is longest can be selected to be deactivated when a need for deactivation takes place. The weight factors can be used e.g. in cases where different ones of the electric energy sources have different operating lifetimes. The weight factor can be higher for such energy sources which have shorter operating lifetimes than for energy sources which have longer operating lifetimes. This approach tends to balance the rates of wear of the electric energy sources.

In control equipment according to an exemplifying and non-limiting embodiment of the invention, the controller 104 is configured to select, from among inactive electric energy sources, an electric energy source to be activated at least partly on the basis of efficiencies of the inactive electric energy sources. In this exemplifying case, a particular one of the inactive electric energy sources whose efficiency is highest can be selected to be activated when a need for activation takes place. This approach tends to minimize the losses of whole electric power system.

In control equipment according to an exemplifying and non-limiting embodiment of the invention, the controller 104 is configured to select, from among active electric energy sources, an electric energy source to be deactivated on the basis of efficiencies of the active electric energy sources. In this exemplifying case, a particular one of the active electric energy sources whose efficiency is lowest can be selected to be deactivated when a need for deactivation takes place. This approach tends to minimize the losses of whole electric power system.

In control equipment according to an exemplifying and non-limiting embodiment of the invention, the controller 104 is configured to select, from among inactive electric energy sources, an electric energy source to be activated at least partly on the basis of operating costs of the inactive electric energy sources. In this exemplifying case, a particular one of the inactive electric energy sources whose operating costs per a time unit is lowest can be selected to be activated when a need for activation takes place. This approach tends to minimize the operating costs of the whole electric power system.

In control equipment according to an exemplifying and non-limiting embodiment of the invention, the controller 104 is configured to select, from among active electric energy sources, an electric energy source to be deactivated at least partly on the basis of operating costs of the active electric energy sources. In this exemplifying case, a particular one of the active electric energy sources whose operating costs per a time unit is highest can be selected to be deactivated when a need for deactivation takes place. This approach tends to minimize the operating costs of the whole electric power system.

In control equipment according to an exemplifying and non-limiting embodiment of the invention, the controller 104 is configured to receive an operation mode signal Op_mode indicative of a prevailing operation mode of the electric power system. In this exemplifying case where the electric power system is a part of an electric system of a ship or a ferry, the operation mode signal Op_mode may express for example whether the operation mode is open sea operation, harbor operation when driving to a mooring site, or harbor operation when moored. The controller 104 is configured to increase activation priorities and decrease deactivation priorities of first ones of the electric energy sources 106-110 with respect to second ones of the electric energy sources in response to a situation in which the operation mode signal is indicative of a first operation mode. The first operation mode can be for example the above-mentioned open sea operation. In this exemplifying case, the activation priorities of the electric energy sources 108-110 based on fuel combustion can be increased and the activation priorities of the electric energy sources 106 and 108 based on batteries can be decreased. The controller 104 is configured to decrease the above-mentioned activation priorities and increase the above-mentioned deactivation priorities of the first ones of the electric energy sources with respect to the second ones of the electric energy sources in response to a situation in which the operation mode signal is indicative of a second operation mode. The second operation mode can be for example the above-mentioned harbor operation when moored. In this exemplifying case, the activation priorities of the electric energy sources 108-110 based on fuel combustion can be decreased and the activation priorities of the electric energy sources 106 and 108 based on batteries can be increased because in many harbors it is possible to receive charging energy for the batteries from the shore side. The controller 104 is configured to select, from among inactive electric energy sources, an electric energy source to be activated at least partly on the basis of the activation priorities of the inactive electric energy sources. The controller 104 is configured to select, from among active electric energy sources, an electric energy source to be deactivated at least partly on the basis of the deactivation priorities of the active electric energy sources. For example, during steady open sea operation it may be advantageous to use a different set of active electric energy sources than when driving a ship or a ferry in narrow routes in a harbor. For example in the harbor driving, it is advantageous that the active electric energy sources are such electric energy sources which provide good power and steering responses. The controller 104 can be configured to maintain different pre-determined sets of activation and inactivation priorities for different pre-defined operation modes.

It is to be noted that the above-presented principles to select an electric energy source to be activated and to select an electric energy source to be deactivated are only non-limiting examples and many other principles can be applicable as well. Furthermore, it is also possible that a selection is carried out by directing suitable mathematical and/or logical operations to data related to two or more different selection principles. The data may comprise information about e.g. cumulative service times, efficiencies, operational costs, starting characteristics, activation and deactivation priorities based on the operation mode, etc.

In control equipment according to an exemplifying and non-limiting embodiment of the invention, the controller 104 is configured to reduce the load of the electric power system during activation of an inactive electric energy source until the electric energy source being activated is ready to produce electric power. This arrangement improves the stability of the electric power system during the activation. The load reduction can be carried out for example by controlling e.g. one or more converters of the propulsion system 119 and/or one or more other parts of the load 122.

The implementation of the control equipment 101 can be based on one or more analogue circuits, one or more digital processing circuits, or a combination thereof. Each digital processing circuit can be a programmable processor circuit provided with appropriate software, a dedicated hardware processor such as for example an application specific integrated circuit "ASIC", or a configurable hardware processor such as for example a field programmable gate array "FPGA". Furthermore, the control equipment 101 may comprise one or more memory circuits each of which can be for example a Random Access Memory "RAM" circuit.

The electric energy sources 106-110 can be presented, to the control equipment 101, as fixed format data entities which comprise parameters such as for example nominal power, maximum power, efficiency, operating costs per a time unit, starting characteristics, and/or other parameters that can be used for determining the above-discussed activation and deactivation limits, for selecting an energy source to be activated when a need for activation takes place, and/or for selecting an energy source to be deactivated when a need for deactivation takes place. In this exemplifying case, the control equipment 101 is suitable for different sets of electric energy sources because each electric energy source is depicted with a fixed format data entity regardless of the type of the electric energy source.

Figure 2:
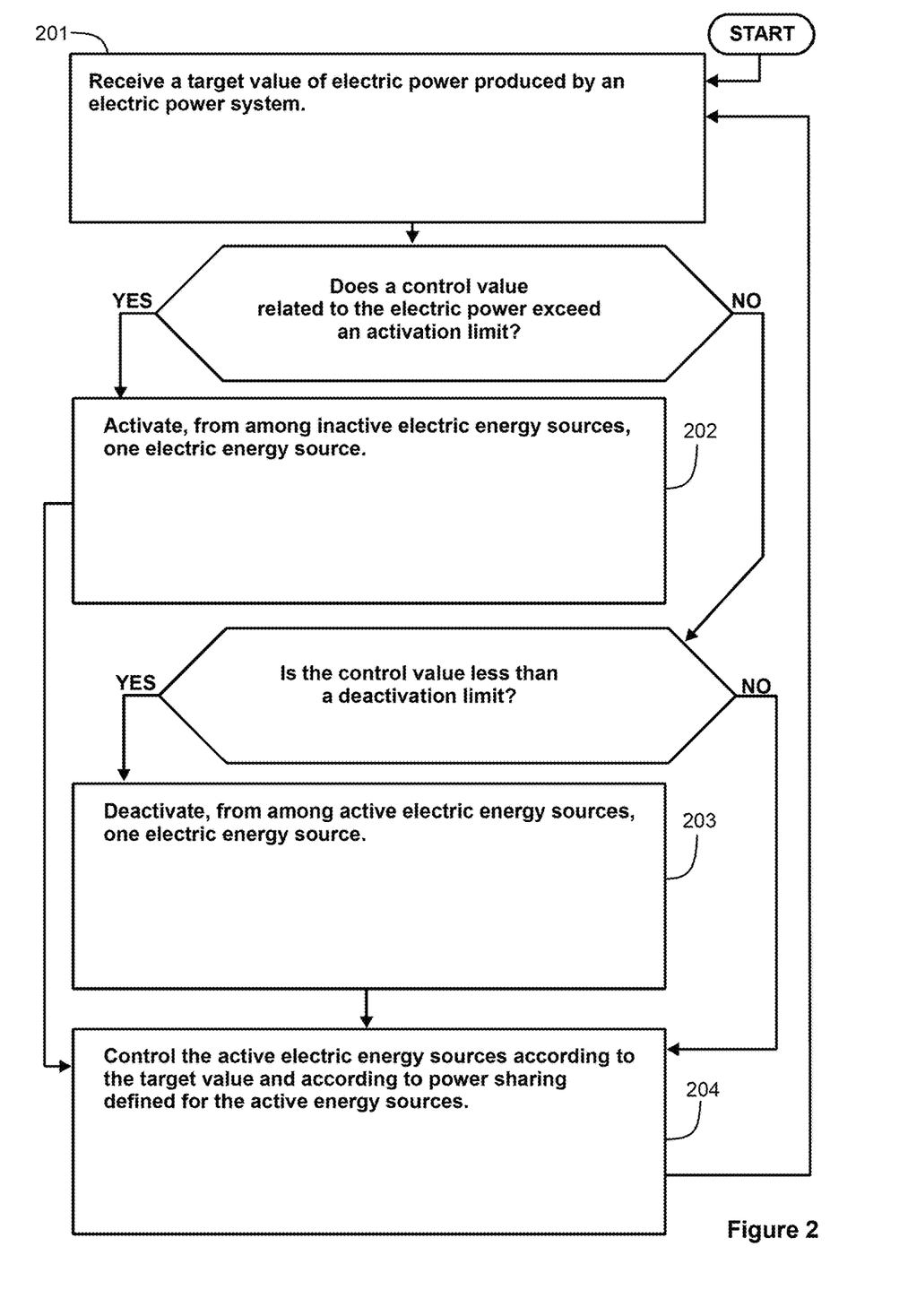
FIG. 2 is a flowchart of a method according to an exemplifying and non-limiting embodiment of the invention for controlling an electric power system.

FIG. 2 shows a flowchart of a method according to an exemplifying and non-limiting embodiment of the invention for controlling an electric power system that comprises electric energy sources. The method comprises the following actions:

action 201: receiving a target value of electric power produced by the electric power system, action 202: activating, from among inactive ones of the electric energy sources, one electric energy source in response to a situation in which a control value exceeds an activation limit, the control value being dependent on the target value of the electric power or the actual value of the electric power, action 203: deactivating, from among active ones of the electric energy sources, one electric energy source in response to a situation in which the control value drops below a deactivation limit, and action 204: controlling the active ones of the electric energy sources according to the target value and according to power sharing defined for the active ones of the electric energy sources.

The electric energy source to be activated is selected, from among the inactive electric energy sources, at least partly on the basis of temporal lengths of prevailing inactivity periods of the inactive electric energy sources.

In a method according to an exemplifying and non-limiting embodiment of the invention, the activation limit is a first predetermined proportion of the sum of the maximum electric powers of the active electric energy sources, and the deactivation limit is a second predetermined proportion of the sum of the maximum electric powers of the active electric energy sources, where the second predetermined proportion is smaller than the first predetermined proportion.

A method according to an exemplifying and non-limiting embodiment of the invention comprises determining the activation limit at least partly on the basis of the sum of the maximum electric powers of the active electric energy sources and on the basis of data related to the one of the inactive electric energy sources being activated when the control value exceeds the activation limit.

A method according to an exemplifying and non-limiting embodiment of the invention comprises determining the deactivation limit at least partly on the basis of the sum of the maximum electric powers of the active electric energy sources and on the basis of data related to those of the active electric energy sources which remain active after deactivation of the one of the active electric energy sources.

A method according to an exemplifying and non-limiting embodiment of the invention comprises selecting, from among the active electric energy sources, an electric energy source to be deactivated at least partly on the basis of temporal lengths of prevailing activity periods of the active electric energy sources.

A method according to an exemplifying and non-limiting embodiment of the invention comprises selecting, from among the inactive electric energy sources, an electric energy source to be activated at least partly on the basis of cumulative service times of the inactive electric energy sources.

A method according to an exemplifying and non-limiting embodiment of the invention comprises selecting, from among the active electric energy sources, an electric energy source to be deactivated at least partly on the basis of cumulative service times of the active electric energy sources.

A method according to an exemplifying and non-limiting embodiment of the invention comprises selecting, from among the inactive electric energy sources, an electric energy source to be activated at least partly on the basis of efficiencies of the inactive electric energy sources.

A method according to an exemplifying and non-limiting embodiment of the invention comprises selecting, from among the active electric energy sources, an electric energy source to be deactivated on the basis of efficiencies of the active electric energy sources.

A method according to an exemplifying and non-limiting embodiment of the invention comprises:

receiving an operation mode signal indicative of a prevailing operation mode of the electric power system, increasing activation priorities and decreasing deactivation priorities of first ones of the electric energy sources with respect to second ones of the electric energy sources in response to a situation in which the operation mode signal is indicative of a first operation mode, decreasing the activation priorities and increasing the deactivation priorities of the first ones of the electric energy sources with respect to the second ones of the electric energy sources in response to a situation in which the operation mode signal is indicative of a second operation mode, selecting, from among the inactive electric energy sources, an electric energy source to be activated at least partly on the basis of the activation priorities of the inactive electric energy sources, and selecting, from among the active electric energy sources, an electric energy source to be deactivated at least partly on the basis of the deactivation priorities of the active electric energy sources.

A computer program according to an exemplifying and non-limiting embodiment of the invention comprises computer executable instructions for controlling a programmable processing system to carry out actions related to a method according to any of the above-described exemplifying and non-limiting embodiments of the invention.

A computer program according to an exemplifying and non-limiting embodiment of the invention comprises software modules for controlling an electric power system that comprises electric energy sources. The software modules comprise computer executable instructions for controlling a programmable processing system to:

activate, from among inactive ones of the electric energy sources, one electric energy source in response to a situation in which a control value exceeds an activation limit, the control value being dependent on a target value of electric power produced by the electric power system or the actual value of the electric power, and deactivate, from among active ones of the electric energy sources, one electric energy source in response to a situation in which the control value drops below a deactivation limit, and control the active ones of the electric energy sources according to the target value and according to power sharing defined for the active ones of the electric energy sources.

The software modules comprise computer executable instructions for controlling the programmable processing system to select, from among the inactive electric energy sources, the electric energy source to be activated at least partly on the basis of temporal lengths of prevailing inactivity periods of the inactive electric energy sources.

The software modules can be for example subroutines or functions implemented with programming tools suitable for the programmable processing system.

A computer program product according to an exemplifying and non-limiting embodiment of the invention comprises a computer readable medium, e.g. a compact disc "CD", encoded with a computer program according to an exemplifying embodiment of invention.

A signal according to an exemplifying and non-limiting embodiment of the invention is encoded to carry information defining a computer program according to an exemplifying embodiment of invention.

The specific examples provided in the description given above should not be construed as limiting the scope and/or the applicability of the appended claims. Lists and groups of examples provided in the description given above are not exhaustive unless otherwise explicitly stated.

The invention claimed is:

1. Control equipment for controlling an electric power system that includes electric energy sources, the control equipment comprising:
    signal outputs configured to transmit control signals to control the electric energy sources;
    a signal input configured to receive a target value of electric power produced by the electric power system; and
    a controller configured to:
        activate, from among inactive ones of the electric energy sources, one electric energy source in response to a situation in which a control value exceeds an activation limit, the control value being dependent on the target value of the electric power or an actual value of the electric power,
        deactivate, from among active ones of the electric energy sources, one electric energy source in response to a situation in which the control value drops below a deactivation limit, and
        control the active ones of the electric energy sources according to the target value and according to power sharing defined for the active ones of the electric energy sources,
    wherein the controller is further configured to select, from among the inactive electric energy sources, the one electric energy source to be activated based on at least the following: temporal lengths of prevailing inactivity periods of the inactive electric energy sources.

2. The control equipment according to claim 1, wherein the activation limit is a first predetermined proportion of a sum of maximum electric powers of the active electric energy sources, and the deactivation limit is a second predetermined proportion of the sum of the maximum electric powers of the active electric energy sources, the second predetermined proportion being smaller than the first predetermined proportion.

3. The control equipment according to claim 1, wherein the controller is configured to determine the activation limit at least partly based on a sum of maximum electric powers of the active electric energy sources and based on data related to the one inactive electric energy source to be activated when the control value exceeds the activation limit.

4. The control equipment according to claim 1, wherein the controller is configured to determine the deactivation limit at least partly based on a sum of maximum electric powers of the active electric energy sources and based on data related to one or more active electric energy sources of the active electric energy sources which remain active after deactivation of the deactivated electric energy source of the active electric energy sources.

5. The control equipment according to claim 3, wherein the controller is configured to determine the deactivation limit at least partly based on a sum of maximum electric powers of the active electric energy sources and based on data related to one or more electric energy sources of the active electric energy sources which remain active after deactivation of the deactivated electric energy source of the active electric energy sources.

6. The control equipment according to claim 1, where the controller is configured to select, from among the active electric energy sources, the one electric energy source to be deactivated at least partly based on temporal lengths of prevailing activity periods of the active electric energy sources.

7. The control equipment according to claim 1, wherein the controller is configured to select, from among the inactive electric energy sources, the one electric energy source to be activated at least partly based on cumulative service times of the inactive electric energy sources.

8. The control equipment according to claim 1, where the controller is configured to select, from among the active electric energy sources, the one electric energy source to be deactivated at least partly based on cumulative service times of the active electric energy sources.

9. The control equipment according to claim 1, wherein the controller is configured to select, from among the inactive electric energy sources, the one electric energy source to be activated at least partly based on efficiencies of the inactive electric energy sources.

10. The control equipment according to claim 1, wherein the controller is configured to select, from among the active electric energy sources, the one electric energy source to be deactivated based on efficiencies of the active electric energy sources.

11. The control equipment according to claim 1, wherein the controller is further configured to:
    receive an operation mode signal indicative of a prevailing operation mode of the electric power system,
    increase activation priorities and decrease deactivation priorities of first ones of the electric energy sources with respect to second ones of the electric energy sources in response to a situation in which the operation mode signal is indicative of a first operation mode,
    decrease the activation priorities and increase the deactivation priorities of the first ones of the electric energy sources with respect to the second ones of the electric energy sources in response to a situation in which the operation mode signal is indicative of a second operation mode,
    select, from among the inactive electric energy sources, the one electric energy source to be activated at least partly based on the activation priorities of the inactive electric energy sources, and
    select, from among the active electric energy sources, the one electric energy source to be deactivated at least partly based on the deactivation priorities of the active electric energy sources.

12. An electric power system comprising:
    electric energy sources;
    control equipment configured to activate and deactivate the electric energy sources, the control equipment comprising:
        signal outputs configured to transmit control signals to control the electric energy sources, a signal input configured to receive a target value of electric power produced by the electric power system, and a controller configured to:
- activate, from among inactive ones of the electric energy sources, one electric energy source in response to a situation in which a control value exceeds an activation limit, the control value being dependent on the target value of the electric power or an actual value of the electric power,
- deactivate, from among active ones of the electric energy sources, one electric energy source in response to a situation in which the control value drops below a deactivation limit, and
- control the active ones of the electric energy sources according to the target value and according to power sharing defined for the active ones of the electric energy sources, wherein the controller is further configured to select, from among the inactive electric energy sources, the one electric energy source to be activated based on at least the following: temporal lengths of prevailing inactivity periods of the inactive electric energy sources.

13. The electric power system according to claim 12, wherein each of the electric energy sources comprises one of the following: a combustion engine driven generator, a battery, and a fuel cell.

14. A method for controlling an electric power system that includes electric energy sources, the method comprising:
- receiving a target value of electric power produced by the electric power system;
- activating, from among inactive ones of the electric energy sources, one electric energy source in response to a situation in which a control value exceeds an activation limit, the control value being dependent on the target value of the electric power or an actual value of the electric power;
- deactivating, from among active ones of the electric energy sources, one electric energy source in response to a situation in which the control value drops below a deactivation limit; and
- controlling the active ones of the electric energy sources according to the target value and according to power sharing defined for the active ones of the electric energy sources, wherein the method further comprises selecting, from among the inactive electric energy sources, the one electric energy source to be activated based on at least the following: temporal lengths of prevailing inactivity periods of the inactive electric energy sources.

15. A non-transitory computer-readable medium encoded with a computer program to control an electric power system that includes electric energy sources, the computer program including computer executable instructions to control a programmable processing system to:
- activate, from among inactive ones of the electric energy sources, one electric energy source in response to a situation in which a control value exceeds an activation limit, the control value being dependent on a target value of electric power produced by the electric power system or an actual value of the electric power;
- deactivate, from among active ones of the electric energy sources, one electric energy source in response to a situation in which the control value drops below a deactivation limit; and
- control the active ones of the electric energy sources according to the target value and according to power sharing defined for the active ones of the electric energy sources, wherein the computer program further comprises computer executable instructions to control the programmable processing system to select, from among the inactive electric energy sources, the one electric energy source to be activated based on at least the following: temporal lengths of prevailing inactivity periods of the inactive electric energy sources.

* * * * *